(12) United States Patent
Schneider et al.

(10) Patent No.: US 10,272,386 B2
(45) Date of Patent: Apr. 30, 2019

(54) TANK DEVICE

(71) Applicant: Robert Bosch GmbH, Stuttgart (DE)

(72) Inventors: Ralf Schneider, Stuttgart (DE);
Andreas Doeffinger, Leonberg (DE);
Ruben Schreiber, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/748,404

(22) PCT Filed: Jun. 13, 2016

(86) PCT No.: PCT/EP2016/063496
§ 371 (c)(1),
(2) Date: Jan. 29, 2018

(87) PCT Pub. No.: WO2017/016736
PCT Pub. Date: Feb. 2, 2017

(65) Prior Publication Data
US 2018/0214825 A1 Aug. 2, 2018

(30) Foreign Application Priority Data

Jul. 29, 2015 (DE) .................. 10 2015 214 401

(51) Int. Cl.
*F01N 3/20* (2006.01)
*B01D 53/94* (2006.01)

(52) U.S. Cl.
CPC ..... *B01D 53/9431* (2013.01); *B01D 53/9418* (2013.01); *B01D 53/9495* (2013.01);
(Continued)

(58) Field of Classification Search
CPC ................ B01D 53/9495; F01N 3/208; F01N 2610/1406; F01N 2610/10
(Continued)

(56) References Cited

U.S. PATENT DOCUMENTS

2007/0157602 A1 7/2007 Gschwind
2012/0315196 A1* 12/2012 Maus .................... F01N 3/2066
422/174

FOREIGN PATENT DOCUMENTS

DE 202006010615 10/2006
DE 102008011464 9/2009
(Continued)

OTHER PUBLICATIONS

International Search Report for Application No. PCT/EP2016/063496 dated Aug. 29, 2016 (English Translation, 2 pages).

*Primary Examiner* — Tom P Duong
(74) *Attorney, Agent, or Firm* — Michael Best & Friedrich LLP

(57) ABSTRACT

The invention relates to a tank device (1) of a motor vehicle for a reductant for the aftertreatment of the exhaust gas of the motor vehicle, comprising a reservoir (5) for the reductant and a tank installation unit (7) having at least one conveying pump (8) for conveying the reductant out of the reservoir (5) to a point of introduction into an exhaust gas tract of the motor vehicle, wherein the tank installation unit (7) has a heating device (12) arranged adjacent to the conveying pump (8), wherein at least one auxiliary heater (29) is provided, and wherein the auxiliary heater (29, 33) is integrated in a wall (25, 27) of the reservoir (5).

12 Claims, 1 Drawing Sheet

(52) U.S. Cl.
CPC .......... *F01N 3/208* (2013.01); *F01N 3/2066* (2013.01); *F01N 2610/02* (2013.01); *F01N 2610/10* (2013.01); *F01N 2610/1406* (2013.01); *F01N 2610/148* (2013.01); *F01N 2610/1433* (2013.01); *Y02A 50/2325* (2018.01); *Y02T 10/24* (2013.01)

(58) Field of Classification Search
USPC .......................................... 60/274, 286, 303
See application file for complete search history.

(56) References Cited

FOREIGN PATENT DOCUMENTS

| | | |
|---|---|---|
| DE | 102008001280 | 10/2009 |
| DE | 102008015599 | 10/2009 |
| DE | 102010029269 | 12/2011 |
| DE | 102013210742 | 12/2014 |
| DE | 102013211760 | 12/2014 |
| DE | 102013217927 | 3/2015 |

\* cited by examiner

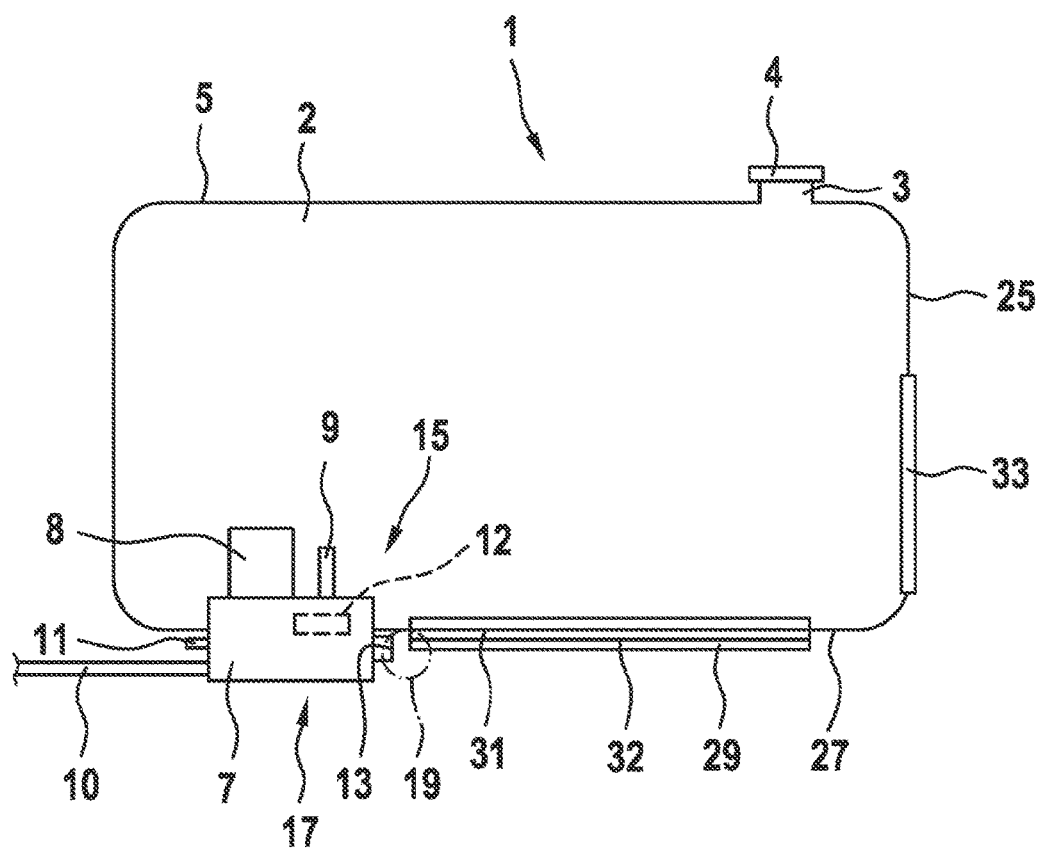

TANK DEVICE

BACKGROUND OF THE INVENTION

The invention is based on a tank device. It is already known from DE 10 2013 217 927 to provide not only a tank installation unit, which is installed in a storage tank for a reducing agent serving for exhaust-gas aftertreatment and which has a heater, but also an auxiliary heater in the region of the storage tank. However, said auxiliary heater consists of a wire heater arranged in the tank interior. This is electrically contacted via an intermediate platform of the tank installation unit.

Also, DE 10 2006 046 900 describes the use of a reducing agent container, which contains two heating elements, in the context of the reduction of nitrogen oxides of an internal combustion engine.

It is known from DE 20 2006 010 615 to heat a storage tank for a liquid required in a motor vehicle, for example for exhaust-gas aftertreatment, with the cooling water of the internal combustion engine of the motor vehicle.

DE 10 2008 011 464 discloses an integration of a heating layer into the wall of a storage tank for a reducing agent serving for exhaust-gas aftertreatment.

It is known from DE 10 2008 015 599 to arrange, outside a liquid tank, a heater in the form of a microwave radiation source in order to heat the liquid in the tank by means of electromagnetic radiation.

It is known from DE 10 2013 210 742 to insert a heating mat in the region of the base of a tank device for a reducing agent serving for exhaust-gas aftertreatment.

SUMMARY OF THE INVENTION

By comparison, the tank device according to the invention has the advantage of ensuring reliable heating and sustainable maintenance of the liquid state of up to more than 90% of any frozen reducing agent by means of the interaction of the heating device and the auxiliary heater, wherein the form and size of the auxiliary heater can be tailored simply and in an ice-pressure-resistant manner to the vehicle-specific requirements with regard to the thawing power, the tank form and/or the available installation space.

Welding of the auxiliary heater into the wall of the storage container of the tank device is particularly advantageous because this presents a construction which is space-saving and, in particular with respect to ice pressure, mechanically robust.

Furthermore, it is advantageous in particular for a mirror-coated surface or a reflective layer or coating to be provided, which minimizes the energy expenditure during heating by aligning the heat radiation.

BRIEF DESCRIPTION OF THE DRAWINGS

Exemplary embodiments of the invention are illustrated in the drawing and discussed in more detail in the following description.

In the drawing:

FIG. 1 shows a tank device with tank installation unit and auxiliary heater.

DETAILED DESCRIPTION

FIG. 1 shows a tank device 1 having a storage container 5 for a reducing agent, for example an aqueous urea solution, serving for the selective catalytic reduction of nitrogen oxides in the exhaust gas of an in particular auto-ignition internal combustion engine of a motor vehicle. The tank interior 2 of the storage container is able to be filled with the reducing agent via a filler opening 3 which is arranged in the tank roof and which is able to be closed by way of a tank cap 4. A tank installation unit 7 is arranged in the region of the tank base wall 27 of the storage container and has a region 15 which projects into the tank interior and a region 17 which is situated outside the tank interior. The tank installation unit contains a delivery pump 8 by means of which the reducing agent is able to be pumped out of the tank according to requirement. A delivery line 10 which is connected to the tank installation unit subsequently supplies the reducing agent to a dosing device (not illustrated in more detail) and then to the exhaust tract of the internal combustion engine. The tank installation unit also contains a heating device 12 for the possibly necessary maintenance of the liquid state, or for the thawing, of the reducing agent, in the case of low outside temperatures, in particular in the region of the components of the tank installation unit which project into the tank interior or face the tank interior. Here, a further component of the tank installation unit is a fill-level sensor 9 which is designed for example as an ultrasonic sensor. Moreover, a quality sensor (not illustrated in more detail), which is designed for example as a combined fill-level and quality sensor, may be provided. In addition to the hydraulic connection to the delivery line 10 outside the storage container, the tank installation unit has, outside the storage container, an electrical interface 11 for the supply of its components with electrical energy or for the electrical activation of said components and/or for the reading out of measurement values, for example concerning the fill level of the reducing agent in the storage container. In addition to the heating device 12 which is already contained in the tank installation unit, the tank device 1 has an auxiliary heater which is integrated in a wall of the storage container. Here, the auxiliary heater 29 is situated in the tank base wall 27 and has a heating foil or heating mat 31. This heating foil or heating mat is surrounded either on both sides or at least on the side facing the tank interior by the material of the tank wall. Provided on the side facing away from the tank interior is a mirror-coated surface 32 which reflects heat radiation into the tank interior 2. The electrical contacting of the auxiliary heater 29 is realized via an electrical connection point 13 which is preferably situated outside the storage container and arranged in the region 17 of the tank installation unit. A circle 19 schematically marks here the electrical connection between the connection point 13 and the auxiliary heater 29. Said connection may be realized via wires or a connector and/or via a lead frame. The electrical interface for the auxiliary heater can provide the following signals: voltage supply to the auxiliary heater, current readback, allowance for temperature sensors/thermal fuses and the like. The embodiment of the tank device as per FIG. 1 comprises a further auxiliary heater 33 which is integrated not in the tank base but in a side wall 25 of the storage container. The electrical contacting of said heater is not illustrated in more detail and may be realized either via the auxiliary heater 29 or else directly via the tank installation unit.

In a modified embodiment, the tank installation unit may also be arranged in the region of a side wall or in the region of the tank roof. Alternatively, it is possible also for the further auxiliary heater 33 to be omitted in the region of the side wall, or, instead of the auxiliary heater 29 in the tank base 27, for only the side-wall auxiliary heater 33 to be provided. The electrical contacting of the respective auxiliary heater may alternatively also be realized separately from the tank installation unit.

The design of the auxiliary heater is realized over as large an area as possible and may be formed in an intrinsically safe manner by way of predetermined breaking points or by way of corresponding temperature-dependent activation. The fastening of the auxiliary heater is realized for example via an injection process in the tank base or in a side wall of the storage container. Furthermore, it is possible for additional insulation with respect to outside temperature or heat influences to be provided in order to minimize heat losses. The auxiliary heater may be fitted on the tank base for flat tank geometries, and also or only on the side walls for higher tank geometries. In order to increase the stability, it is possible for a tank which is present to be encapsulated by injection molding with a stabilizing further material. The auxiliary heater allows a hydraulic connection of the thawed medium to the intake point (not illustrated in more detail) of the delivery pump 8, which point is situated in the region 15 of the tank installation unit, to be produced so as to be permanent. A suitable form of the auxiliary heater in combination with a corresponding form of the tank wall allows a slosh protection function to be achieved, specifically at low tank fill levels.

The activation in particular of the auxiliary heater generally occurs for example by means of a pulse-width modulated signal via an additional control unit with a software-dependent heating strategy or by means of integration of the necessary hardware/software into existing control units. The auxiliary heater is in this case monitored and checked for plausibility by means of on-board diagnosis functions. Additional sensors, such as for example temperature sensors, may be used for the purpose of regulation/control. The activation may be realized in a parallel, sequential or overlapping manner with respect to other heaters such as the heating device 12, pressure-line heaters (not illustrated in more detail) or the like.

The tank installation unit may also comprise an intermediate platform as described in DE 10 2013 217 927.

The invention claimed is:

1. A tank device (1) of a motor vehicle, the tank device for containing a reducing agent serving for the aftertreatment of exhaust gas of the motor vehicle, the tank device having a storage container (5) for the reducing agent, and having a tank installation unit (7) which comprises at least one delivery pump (8) for conveying the reducing agent out of the storage container (5) to a point of introduction into an exhaust tract of the motor vehicle, wherein the tank installation unit (7) has a heating device (12) which is arranged adjacent to the delivery pump (8), wherein at least one auxiliary heater (29, 33) is integrated into a wall (25, 27) of the storage container (5), and wherein the auxiliary heater (29, 33) has a heating mat (31) which is welded into the wall (25, 27) of the storage container (5).

2. The tank device as claimed in claim 1, characterized in that the auxiliary heater (29, 33) is integrated in a region of a tank base (27) in the wall.

3. The tank device as claimed in claim 2, characterized in that the tank installation unit (7) is arranged in the region of the tank base (27).

4. The tank device as claimed in claim 3, characterized in that the auxiliary heater (29, 33) or a further auxiliary heater (33) is integrated in a region of a side wall (25) in the wall.

5. The tank device as claimed in claim 4, characterized in that the auxiliary heater (29, 33) has a mirror-coated surface (32), wherein the mirror-coated surface is arranged on a side of the auxiliary heater (29, 33) facing away from an interior (2) of the storage container and is configured to reflect heat radiation into the interior (2).

6. The tank device as claimed in claim 5, characterized in that the tank installation unit (7) has a region (15) which projects into the interior (2) of the storage container and a region (17) which is situated outside the interior (2).

7. The tank device as claimed in claim 6, characterized in that the auxiliary heater (29, 33) is electrically contacted on a side of the wall (25, 27) facing away from the interior (2) via the tank installation unit (7) in a region (17) of the tank installation unit (7) situated outside the tank device.

8. The tank device as claimed in claim 1, characterized in that the tank installation unit (7) is arranged in a region of a tank base (27).

9. The tank device as claimed in claim 1, characterized in that the auxiliary heater (29, 33) or a further auxiliary heater (33) is integrated in a region of a side wall (25) in the wall.

10. The tank device as claimed in claim 1, characterized in that the auxiliary heater (29, 33) has a mirror-coated surface (32), wherein the mirror-coated surface is arranged on a side of the auxiliary heater (29, 33) facing away from an interior (2) of the storage container and is configured to reflect heat radiation into the interior (2).

11. The tank device as claimed in claim 1, characterized in that the tank installation unit (7) has a region (15) which projects into an interior (2) of the storage container and a region (17) which is situated outside the interior (2).

12. The tank device as claimed in claim 11, characterized in that the auxiliary heater (29, 33) is electrically contacted on a side of the wall (25, 27) facing away from the interior (2) via the tank installation unit (7) in a region (17) of the tank installation unit (7) situated outside the tank device.

* * * * *